United States Patent [19]
Jones

[11] 3,876,057
[45] Apr. 8, 1975

[54] METHOD AND APPARATUS FOR ARRANGING BRICKS TO BE FED IN A PREDETERMINED NUMBER OF ROWS

[76] Inventor: Robert E. Jones, 15 S. Oak Forest Dr., Asheville, N.C. 28803

[22] Filed: Jan. 29, 1974

[21] Appl. No.: 437,543

Related U.S. Application Data

[63] Continuation-in-part of Ser. No. 295,613, Oct. 6, 1972, Pat. No. 3,837,466.

[52] U.S. Cl. ................... 198/30; 53/159; 198/221; 214/6 A
[51] Int. Cl. .......................................... B65g 47/24
[58] Field of Search ........ 214/6 A; 198/29, 30, 221; 53/159

[56] References Cited
UNITED STATES PATENTS

| | | | |
|---|---|---|---|
| 3,603,466 | 9/1971 | Lingle | 214/152 |
| 3,638,391 | 2/1972 | Fluck | 53/159 X |
| 3,665,674 | 5/1972 | Bivans et al. | 53/186 X |
| 3,738,514 | 6/1973 | Jones | 214/64 X |

*Primary Examiner*—Robert J. Spar
*Assistant Examiner*—Leslie J. Paperner
*Attorney, Agent, or Firm*—William E. Mouzavires

[57] ABSTRACT

Brick groups each containing the same predetermined number of rows are fed by individual pusher members along a horizontal path. When certain groups of bricks reach a transfer station intermediate the ends of said path, the entire group is pushed laterally to one side of the path on a storage platform. A predetermined number of rows on the storage platform are then moved longitudinally alongside the path and subsequently returned laterally onto the path to be united with subsequent groups of bricks to form a predetermined number of rows of bricks suitable for feeding into the trays of a conveyor at the outlet end of the path to be taken to a further stacking station where the bricks are ultimately stacked to form a brick pack. When the brick pusher members reach the transfer platform, they are lowered by means of an elevator and returned to the inlet of the path where they are raised by another elevator to commence further movement along the path to push another group of bricks to the transfer station. From the transfer station the brick groups are conveyed to the outlet of the path to be fed into the trays by means of overhead pusher members which descend to simultaneously push the two furthermost brick groups on the path towards the tray conveyor. Another pusher member movable alongside the path is employed to convey the predetermined number of brick rows from the storage platform down the path from the transfer station where another pusher member is positioned to restore these rows to the path to be joined with one of the brick groups to form a brick group having a predetermined number of rows suitable for feeding into the tray conveyor.

16 Claims, 9 Drawing Figures

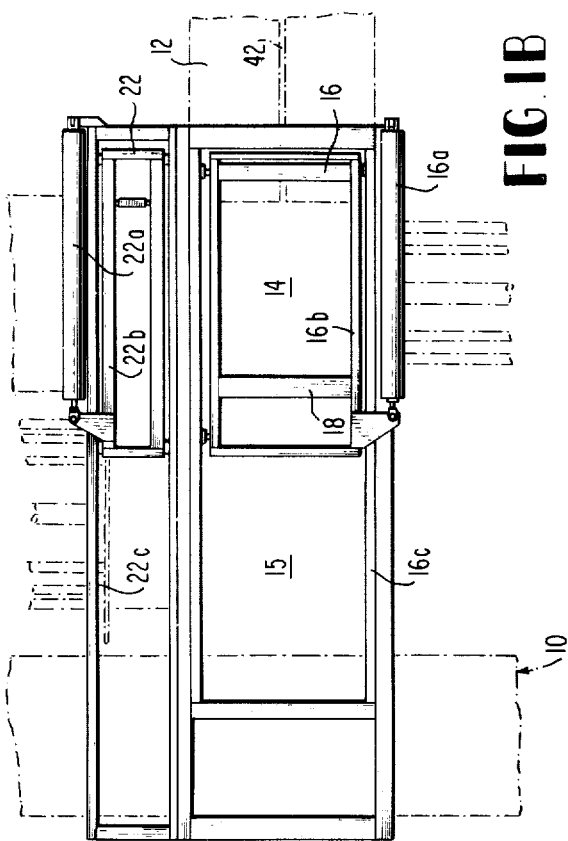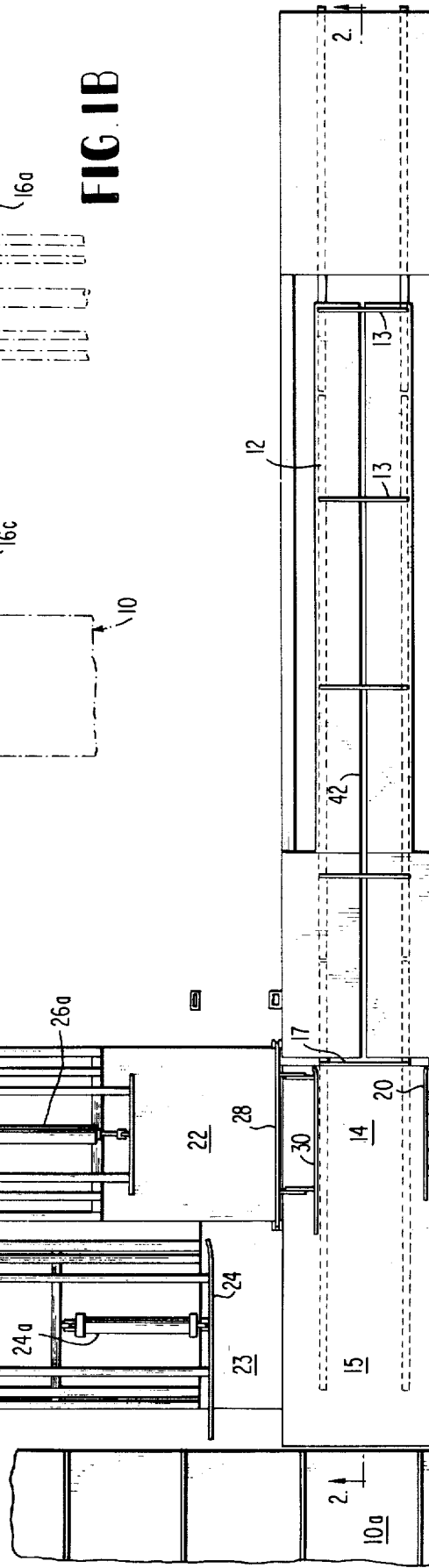

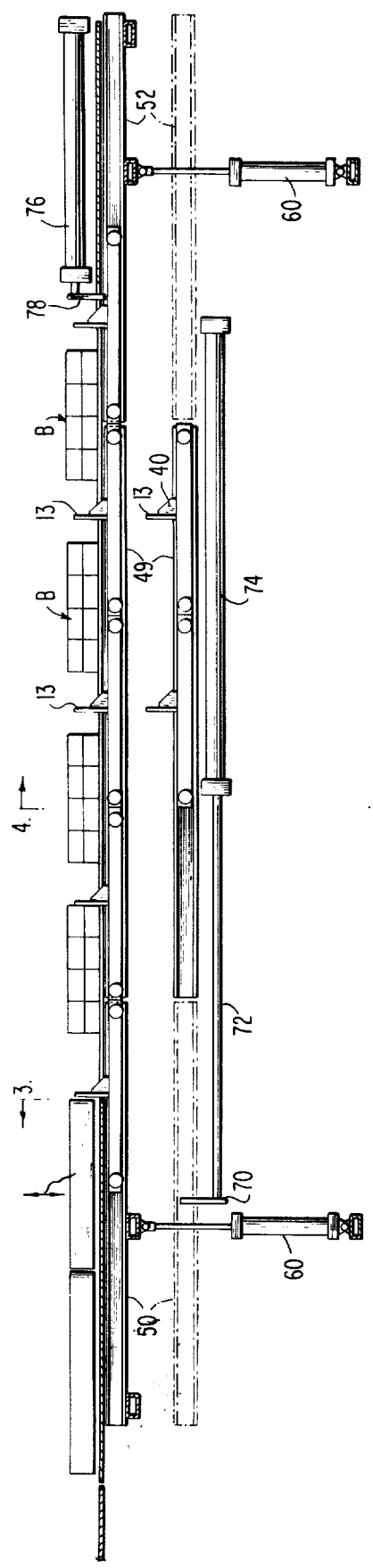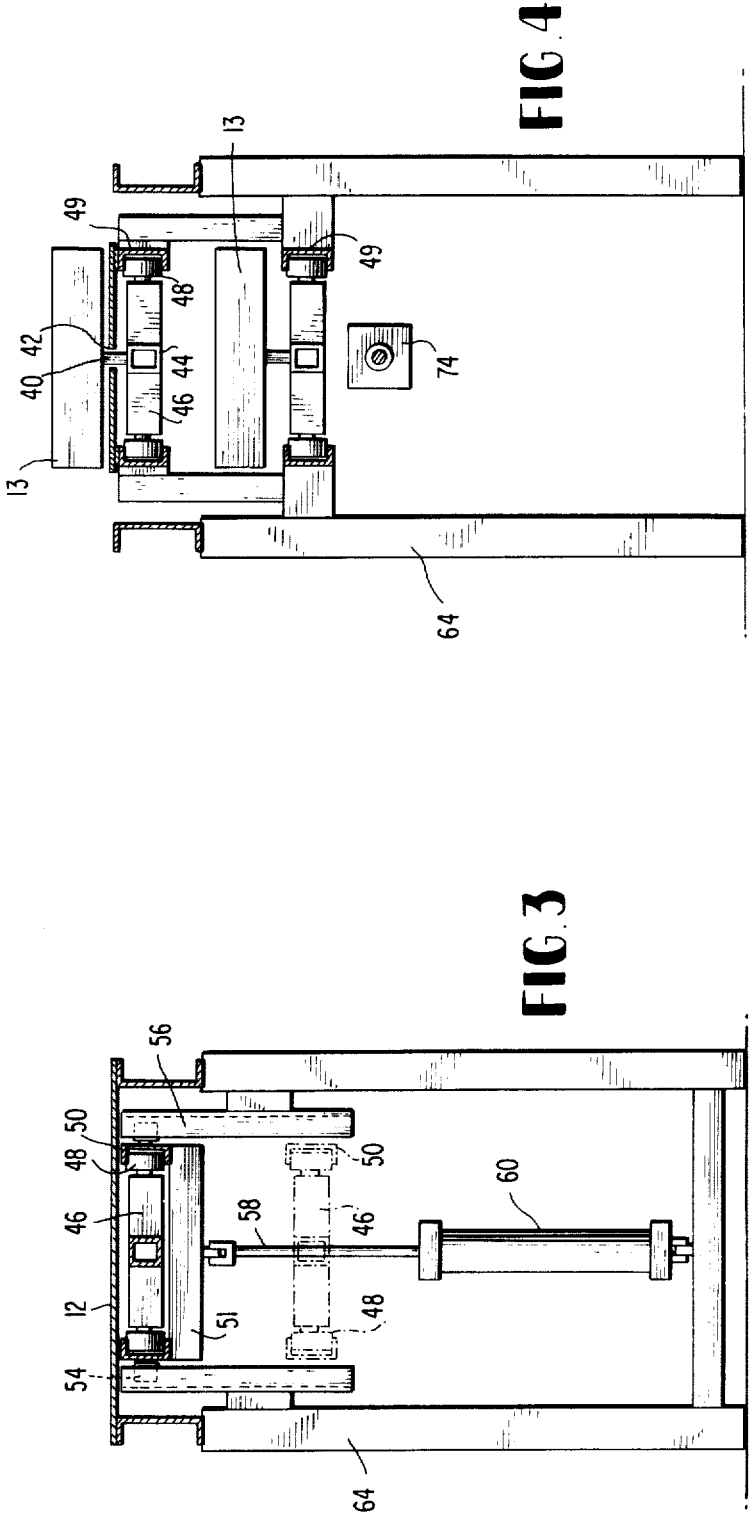
FIG. 2
FIG. 3
FIG. 4

3,876,057

METHOD AND APPARATUS FOR ARRANGING BRICKS TO BE FED IN A PREDETERMINED NUMBER OF ROWS

RELATED APPLICATIONS

This application is a continuation-in-part of my co-pending U.S. application Ser. No. 295,613 filed Oct. 6, 1972, now U.S. Pat. No. 3,837,466.

OBJECTS OF INVENTION

The present invention generally relates to handling articles such as bricks and more specifically to arranging bricks in a predetermined number of rows suitable to be fed into the trays of a conveyor such as, for example, shown in my U.S. Pat. No. 3,738,514. The present invention may also be employed for rearranging bricks after they have been dried in a kiln of a brick manufacturing plant to obtain a certain blend of bricks.

One of the objects of the present invention is to provide method and apparatus for arranging bricks in a predetermined number of rows for subsequent stacking one on top of the other to form a brick pack. More specifically, included herein is such method and apparatus which will arrange bricks in a predetermined number of rows for feeding into the trays of a conveyor which ultimately will deposit the bricks for stacking to form a desired brick pack.

Another object of the present invention is to provide method and apparatus which may be employed in conjunction with an existing brick conveyance system at of brick manufacturing plant, for example, for increasing or decreasing the number of rows of bricks handled by the conveyance system so as to permit a predetermined number of rows of bricks to be assembled for stacking to form a commercial brick pack.

A further object of the present invention is to provide such a method and apparatus which may also be employed for rearranging the positions of bricks, for purposes of blending, after they have been dried in a kiln of a brick manufacturing plant and prior to stacking to form a commercial brick pack.

SUMMARY OF INVENTION

In one commercial embodiment, the present invention is employed to increase the number of rows of bricks handled by a conveyor system which, for example, functions to convey a plurality of groups of bricks along a path after the bricks have been dried in a kiln of a brick manufacturing plant, the brick groups in this one commercial embodiment, each including two layers with each layer including ten rows of bricks. As it is desired to eventually stack the bricks to form a brick pack, for example, ten layers high and with each layer including eleven rows, it is necessary to add an additional row of bricks to each of the layers included in each of the brick groups, prior to stacking to form the brick pack. The present invention achieves the latter by periodically removing certain brick groups at a transfer station to one side of the path of conveyance where they are maintained on a storage surface. Subsequently, as additional brick groups are conveyed beyond the transfer station, one row of the removed bricks on the storage surface, is returned to the path of conveyance to be joined with the ten rows to form eleven rows.

In one embodiment, a plurality of individual pusher members are employed to convey the brick groups along the path to the transfer station. When the individual pusher member arrive at the transfer station they descend through means of an elevator to be returned to the inlet of the path for subsequent pushing of another group of bricks towards the transfer station.

When certain groups of bricks arrive at the transfer station, a pusher member moves transversely across the transfer station to remove the entire group of bricks to one side of the transfer station on the storage surface against a pusher member. As subsequent brick groups are conveyed beyond the transfer station, one row of the removed bricks on the storage surface is returned to the path to be joined with each of these brick groups to form eleven rows in each of the brick groups. Such return is achieved by a pusher member operating transversely of the path. The single rows of bricks are conveyed from the storage surface along the path by means of a pusher member. Each of the brick groups are conveyed from the transfer station down the path to have added thereto a single row of bricks by means of overhead pusher members. After a single row of bricks has been removed from the storage surface and moved down the path, the pusher member on the storage surface functions to move the remaining rows of bricks on the storage surface towards the path against a stop member so as to align the next row with the pusher member to be moved thereby down the path for subsequent return to the path to unite with the next group of bricks to form eleven rows.

Conveyance of the brick groups from the transfer station further down the path to the trays is achieved by an overhead pusher member which has two spaced pusher members for simultaneously pushing two groups of bricks down the path. One of these groups is located at the transfer station and the other group is located downstream of the transfer station at the point where an additional row of bricks is added thereto to form eleven rows.

DRAWINGS

Other objects and advantages of the present invention will become apparent from the following more detailed description taken in conjunction with the attached drawings in which:

FIG. 1A is a plan view of apparatus embodying the present invention with portions thereof broken away for clarity;

FIG. 1B is a plan view of an overhead brick pushing mechanism employed in conjunction with the apparatus of FIG. 1A;

FIG. 2 is a cross-sectional view taken generally along lines 2—2 of FIG. 1A and additionally showing certain brick groups handled by the method and apparatus of the present invention;

FIG. 3 is a cross-sectional view taken generally along lines 3—3 of FIG. 2;

FIG. 4 is a cross-sectional view taken generally along lines 4—4 of FIG. 2; and

DETAILED DESCRIPTION

Figure 5A:
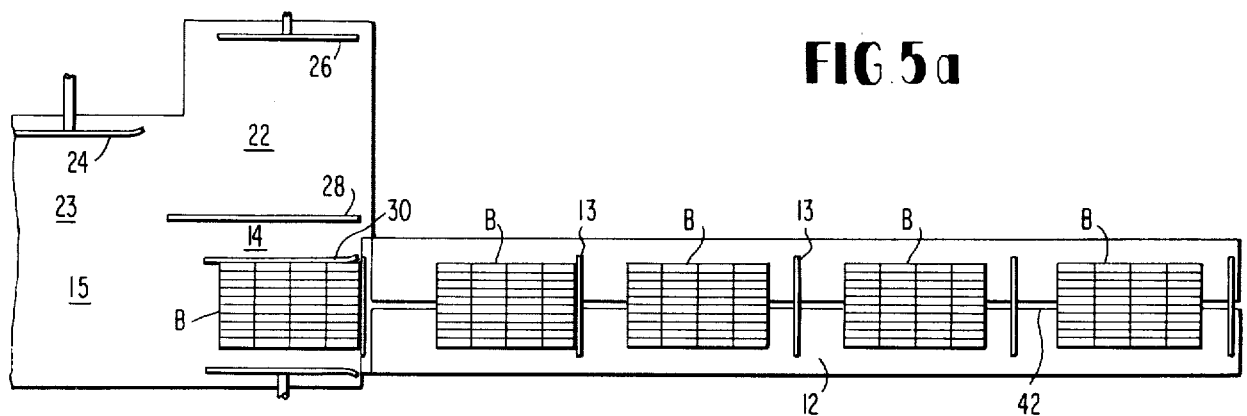
FIGS. 5a, 5b, 5c and 5d are plan views in schematic fashion of the apparatus illustrating successive steps in an actual brick handling operation.

Referring now to the drawings in detail, there is shown for illustrative purposes only, apparatus embodying the present invention and also which may be used for carrying out the method of the present invention. Referring first to FIG. 1A and FIG. 5a, the apparatus includes a horizontal conveyor path 12 along which groups of bricks B are conveyed in two layers by individual pusher members 13 to a transfer station generally designated 14. When the brick groups B arrive at transfer station 14, the individual pusher members 13 are lowered through slot 17 extending transversely across path 12 in a manner to be subsequently described after which pusher members are returned to the inlet of path 12 to push subsequent group bricks B along path 12 to transfer station 14.

The group bricks B are loaded by any suitable brick gripping mechanism, in the instant embodiment in two layers directly onto path 12 to be subsequently engaged and conveyed by pusher members 12 to transfer station 14. In the specific embodiment, each of the layers of group bricks B has ten rows of bricks with each row including four rows. It is ultimately desired to feed a tray conveyor generally designated 10 having individual discrete trays 10a such as disclosed in my U.S. Pat. No. 3,738,514 with two layers of bricks with each layer having eleven rows and with each rows including four bricks. It is therefore necessary to add one row of four bricks each to each of the brick groups B prior to feeding tray conveyor 10. The latter tray conveyor functions to then convey the two layers of brick to an elevator where the layers are further stacked to ultimately form a commercial brick pack which may have, for example, ten layers of brick with each layer having eleven rows and with each row including four bricks. For a more detailed description of the latter stacking operation, reference may be had to my U.S. Pat. No. 3,738,514 whose disclosure is hereby incorporated by reference to this application.

Figure 5B:
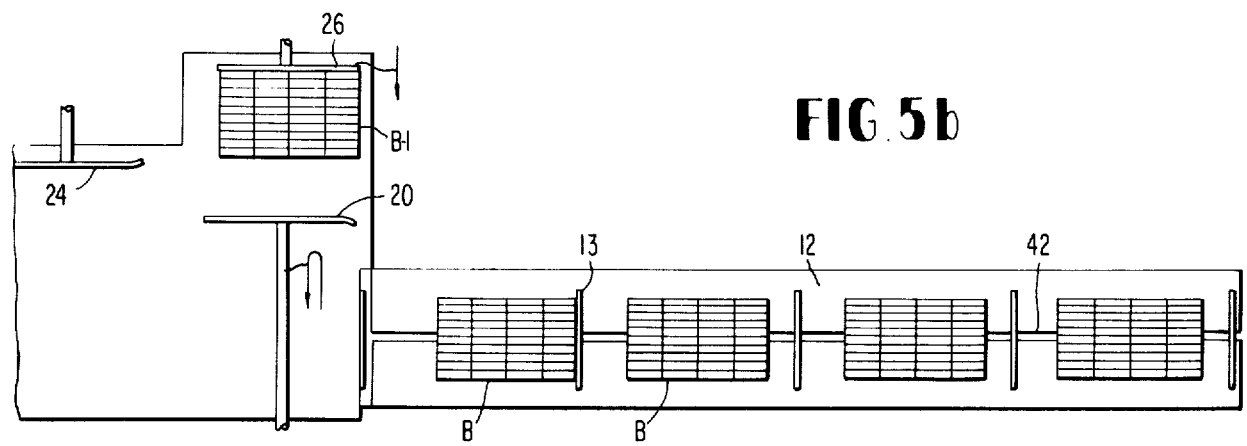
Figure 5C:
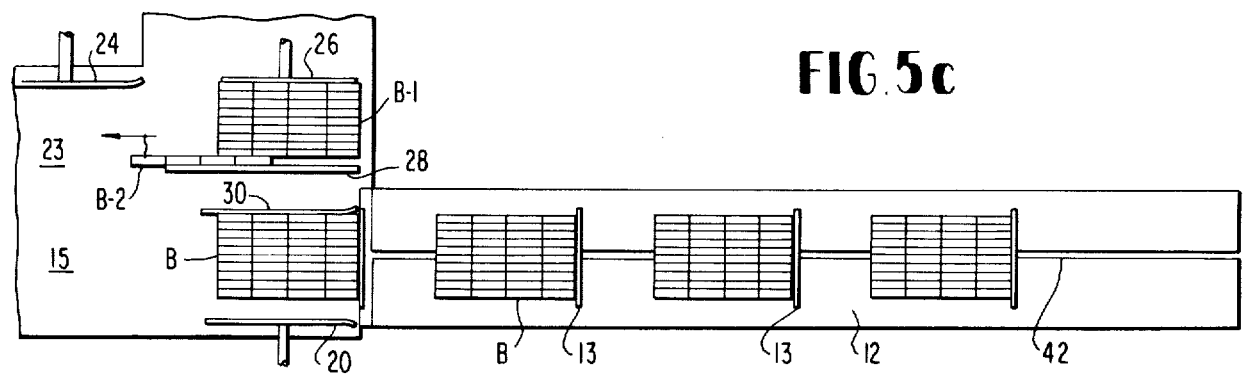
Figure 5D:
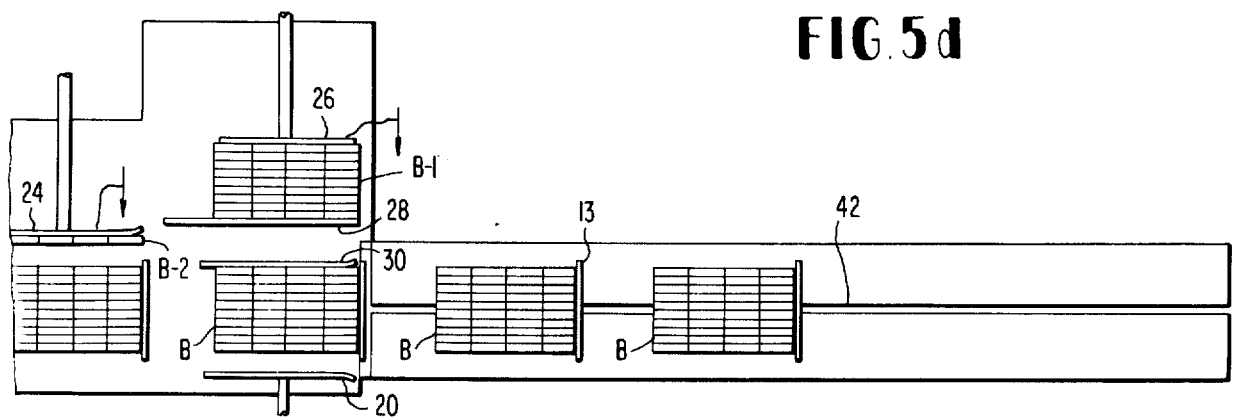

In order to periodically add a row of bricks to the brick groups B normally handled by pushers 12, an entire brick group B is transferred laterally off the conveyor path at transfer station 14 and onto a storage platform or surface generally designated 22. This is achieved in the shown embodiment by a pusher mechanism 20 stationed adjacent transfer station 14 to move across the transfer station to push an entire brick group B onto storage surface 22 as shown, for example, in FIG. 5b. Subsequently, in the particular embodiment described, a single row of bricks B2 is removed from the storage area 22 and moved down the path 12 to a station 23 as shown in FIG. 5c. When the next brick group B arrives at station 15 shown in FIG. 5b, the single row of bricks B2 is returned to the conveyor path to be united with the brick group B to provide eleven rows. A pusher mechanism 24 situated adjacent station 23 is employed to return the single row of bricks B2 as illustrated in FIG. 5d.

Brick groups B are conveyed towards the trays 10a from stations 14 and 15 (See FIGS. 1A and 5d) by means of an overhead brick pusher mechanism including two vertical pusher members 16 and 18 (See FIG. 1B) along the path 12. Pusher member 16 engages the brick group B at transfer station 14 while pusher member 18 engages the brick group situated at station 15 and simultaneously pushes both groups towards tray conveyor 10a.

Movement of the single row of bricks B2 from storage area 22 to station 23 may be achieved by any suitable brick pushing mechanism such as shown by 22 in FIG. 1B or by a mechanism which grips the bricks and moves them over.

Additionally, in the preferred embodiment, when the brick groups B are moved at transfer station 14 to storage area 22 by pusher member 20, they are moved sufficiently to engage a pusher member 26 located at the storage area 22. After a row of bricks B2 is removed from the storage area 22, pusher member 26 is operated to move the brick group B-1 as shown in FIG. 5c so that the outermost row of bricks next to be removed engages against a stop and guide member 28. This aligns the outermost row of bricks B2 to permit it to be conveyed by brick pushing mechanism 22 alongside 12 to station to station 23. Additionally, in the preferred embodiment, an elongated guide plate 30 is utilized to guide the brick groups B as they pass through the transfer station 14 towards station 15. Guide plates 28 and 30 are mounted for vertical movement between upper and lower positions by any suitable mechanism so that when it is desired to transfer an entire brick group B from transfer station 14 to storage area 22, plates 28 and 30 will be in their raised position. After the transfer is effected, plates 28 and 30 will be lowered to provide their guiding functions.

Any suitable actuators may be employed for operating the various pusher plates 20, 26 and 24. Referring to FIG. 1A, pusher member 20 is operated by means of a fluid motor or gas cylinder 20a connected to pusher member 20 with the latter being mounted on a frame 20b which, in turn, is rectilinearly movable along a fixed frame 20d by means of suitable roller or bearing means 20c. As clearly shown in the drawings, pusher member 20 moves rectilinearly at right angles to conveyor path 12 and has a large enough stroke to deposit an entire group of bricks B from transfer station 14 onto storage area 22. Pushers 24 and 26 may have the same type of actuators 24a and 26a as well as the same type of mounting mechanisms as pusher 20 as shown and need not be repeated. It will be understood, however, that pusher 26 and 24 also move at right angles to the path 12 from the side opposite that of pusher 20.

Overhead pushers 16 and 18 also are actuated through a fluid cylinder or air motor 16a fixed to a frame 16b from which the pusher members 16 and 18 depend. Frame 16b is movable along a positive track 16c which in turn, is suitably fixed to the main supporting structure of the apparatus. Although not shown, pushers 16 and 18 are mounted for vertical movement between upper idle positons where they are spaced above bricks groups B and lower operative positions where they engage behind brick groups B at stations 14 and 15, respectively, to convey them towards the tray conveyor 10.

Brick pusher member 22 which functions to move a single row of bricks B2 from storage area 22 to station 23 operates similar to brick pushers 16 and 18. Brick pusher member 22 is actuated through means of a fluid cylinder or air motor 22a fixed to a movable frame 22b which has brick pusher member 22 mounted thereon. Frame 22b is movable along a fixed track 22c through means of motor 22a. Pusher member 22 is mounted by any suitable means for vertical movement between raised and lowered positions similar to that of brick pusher members 16 and 18. Although a specific brick pusher mechanism 22 has been described, it should be understood that any suitable brick gripping mechanism may be employed, for example, such as one which engages the opposite ends of the row B2 and lifts and then moves them along the path to station 23.

Referring now to FIG. 2, pusher members 13 which push individual brick groups B along the path to transfer station 14, are actuated through means of a suitable fluid or air motor 76 mounted adjacent the inlet of conveyor path 12. Motor 76 is connected to a pushing member 78 which, in turn, operates in an elongated slot 42 formed along the center line of conveyor path 12. As shown in FIG. 4, individual pusher members 13 have a generally rectangular shape and extend in a vertical plane so as to be able to engage two layers of bricks which constitute brick groups B. Pusher members 13 have fixed thereto a vertical stem 40 which is received in slot 42 in conveyor path 12. Stem 40 is fixed to a dolly frame including a center channel 44 and cross channels 46 having rollers mounted on the opposite ends thereof as shown in FIG. 4. Rollers 48 are received in fixed tracks 49 which fixed tracks extend for the intermediate length of the conveyor path 12. However, at the opposite ends of conveyor path 12, vertically movable tracks 50 are employed to lower and raise individual pushers 13 to enable them to be lowered through slot 17 at transfer station 40 and then returned under path 12 to the inlet of conveyor path 12 and then elevated to again be actuated by motor 76 to push subsequent brick groups B along path 12.

Referring to FIGS. 2 and 3, there is illustrated the elevatable track 50 which has a pair of rollers or bearing members 54 received in vertical guide channels or tracks 56 which, in turn, are suitably mounted to the vertical columns 64 of the stationary support structure for the apparatus. Elevatable tracks 50 are interconnected by a cross beam 51 which, in turn, is connected to the actuating rod 58 of a fluid motor or air cylinder 60 to raise and lower elevatable tracks 50 between their upper operative positions and lower positions for return to the inlet of path 12. The dotted lines in FIG. 3 indicate the lowermost positions of elevatable tracks 50 and also the positions of the support structure 46 of dollies 13 including the rollers 48.

After the individual pusher members 13 are lowered below the transfer station 14 by means of movable tracks 50, they are returned below the inlet of conveyor path 12 by means of a pusher member 70 connected to an actuating rod 72 of a fluid motor or air cylinder 74 as shown in FIG. 2. It will be seen from FIG. 2, that retraction of actuating rod 72 of motor 74 will cauase pusher 70 to engage the individual pushers 13 and return them along a fixed track 49 situated parallel below upper fixed track 49. Below the inlet of conveyor path 12, is another movable track 52 similar to movable track 50 which operates below the transfer station. Movable track 52 is employed to raise the pushers 13 to the inlet of conveyor path 12 where pusher member 78 operated by motor 76, may then again reengage the brick groups to move them along path 12. Inasmuch as the elevator mechanism and supporting tracks and rollers employed in association with movable track 52 at the inlet of the conveyor path 12 is the same as that used in connection with movable track 50 at the transfer station, repetition of description is not necessary.

To review operation, four brick groups B are simultaneously fed onto platform 12 after which fluid motor 76 is actuated to begin pushing of the brick groups along path 12 towards transfer station 14. When the forwardmost brick group B arrives at transfer station 14, plates 20 and 30 having previously been raised, pusher member 20 is actuated to transfer the entire brick group B to storage area 22 against pusher member 26. Guide plates 28 and 30 are then lowered whereupon fluid motor 76 is actuated to continue the pushing of brick groups B along path 12. When the next brick group B arrives at transfer station 14, overhead pusher 16 is actuated to transfer the brick group to station 15, simultaneously with the latter, pusher member 22 is actuated to transfer one row B2 from the group of bricks B-1 to station 23. Pusher member 24 is then actuated to return the one row B2 to the conveyor path to unite with the brick group at station 15. Overhead pushers 16 and 18 are then returned to their original position and lowered to engage the brick groups at stations 14 and 15 and to convey them towards the tray 10a during which time the brick group at station 15 will be conveyed into tray 10a. Pusher member 26 will then be actuated to push brick group B-1 toward guide plate 28 to position a brick row B2 against guide plate 28 whereupon the latter steps noted above may be repeated to add another row B2 of bricks to a brick group at station 15 prior to transfer into conveyor tray 10a. When all of the brick rows on the storage area have been returned to the path, it is then necessary to push another brick group from transfer station to the storage area and the process is repeated whereby eleven rows of bricks will be fed into the trays.

When individual pusher members 13 arrive at transfer station actuator 60, actuator 60 will be retracted to lower movable track 50 and the pusher member 13 at transfer station 14 whereupon fluid motor 74 is actuated to begin return of the pusher member 13 on movable track 50 into the lower stationary track 49 eventually to arrive at movable track 52 below the inlet of conveyor path 12 whereupon fluid motor 60 is actuated to raise movable track 52 to reposition the pusher member at the inlet of the path 12.

What is claimed is:

1. A method of handling bricks to arrange them in a predetermined number of rows comprising the steps of: successively conveying to and beyond a transfer station a plurality of brick groups each including a plurality of rows of bricks, periodically removing certain brick groups at the transfer station in their entirety to a storage area, removing a number of the bricks from the storage area and adding them to brick groups conveyed to and beyond the transfer station subsequent to the brick group which was removed to the storage area.

2. The method defined in claim 1 wherein at least one row of bricks is removed from the storage area and added to a brick group subsequently conveyed to and beyond the transfer station.

3. The method defined in claim 2 wherein each of the brick groups has ten rows of bricks such that after the row of bricks from the storage area is added to one of the subsequent brick groups, the subsequent brick group will have eleven rows of bricks.

4. The method defined in claim 1 wherein the bricks removed from the storage area are added to a subsequent brick group at a location beyond the transfer station.

5. The method defined in claim 4 wherein brick groups are conveyed to and beyond the transfer station along a fixed path, and wherein the bricks removed from the storage area are moved alongside said path to a point downpath from the transfer station where they are then returned to the path to join a succeeding brick group.

6. The method defined in claim 1 wherein the brick groups are conveyed to the transfer station by means of individual pusher members movable along a fixed path, and wherein the brick groups are moved from the transfer station beyond the transfer station by means other than the pusher members.

7. Apparatus for handling bricks to arrange them in a predetermined number of rows, the apparatus comprising in combination, means for conveying individual brick groups each having a predetermined number of rows along a fixed path, a storage area situated on one side of the path intermediate the ends thereof, means for moving certain brick groups from the path to the storage area while maintaining the brick groups in the same arrangement of rows, and means for successively adding to the subsequent brick groups conveyed along the path a number of rows from the bricks on the storage area to increase the number of rows in the subsequent brick groups.

8. Apparatus defined in claim 7 wherein said means for returning bricks from the storage area to the path includes first means for moving the number of rows down the path and second means for moving the number of rows laterally on the path.

9. Apparatus defined in claim 7 including a stop member situated between the path and the storage area and wherein there is further included means for moving the bricks on the storage area against the stop member.

10. Apparatus defined in claim 7 wherein said means for moving the brick groups to the storage area includes a pusher member movable transversely across the path and wherein the means for returning the number of rows to the path includes a pusher member movable towards the path transversely thereof.

11. Apparatus defined in claim 7 further including a pusher member situated on the storage area for receiving the bricks moved from the path to the storage area, said pusher member being movable towards the path to position the bricks on the storage area in a predetermined position.

12. Apparatus defined in claim 7 including a transfer station on the path intermediate the ends thereof, said bricks being removed to the storage area from the transfer station, and wherein said means for moving the brick groups along the path includes a first means for moving the brick groups to the transfer station and a second means for moving the bricks groups beyond the transfer station along the path.

13. Apparatus defined in claim 12 wherein said first means for moving the brick groups along the path to the transfer station include a plurality of individual pusher members respectively, operable on individual brick groups to push them along the path.

14. Apparatus defined in claim 13 further including means for lowering the individual pusher members when they reach the transfer station and for returning the individual pusher members to the inlet of the path to resume pushing of brick groups along the path.

15. Apparatus defined in claim 12 further including an elongated guide member extending in the direction of the path and being located the transfer station for guiding brick groups as they pass through the transfer station along the path.

16. Apparatus defined in claim 12 wherein there is further included a pair of brick pushers operable over the path to push two brick groups situated at the transfer station and beyond the transfer station in a direction down the path for discharge from the path.

* * * * *